D. FITZPATRICK.
GEAR WHEEL.
APPLICATION FILED FEB. 10, 1916.

1,358,189. Patented Nov. 9, 1920.

WITNESS
Chas. F. Clagett

INVENTOR
David Fitzpatrick
BY
Messimer and Austin
HIS ATTORNEYS

UNITED STATES PATENT OFFICE.

DAVID FITZPATRICK, OF CLEVELAND, OHIO, ASSIGNOR TO THE CLEVELAND WORM & GEAR COMPANY, OF CLEVELAND, OHIO.

GEAR-WHEEL.

1,358,189.

Specification of Letters Patent.

Patented Nov. 9, 1920.

Application filed February 10, 1916. Serial No. 77,361.

*To all whom it may concern:*

Be it known that I, DAVID FITZPATRICK, a subject of the King of Great Britain, and resident of Cleveland, county of Cuyahoga, and State of Ohio, have invented certain new and useful Improvements in Gear-Wheels, of which the following is a specification.

My invention relates in general to a wheel having a periphery formed of material different from that of the body of the wheel and specifically relates to a gear wheel, the toothed portion of which is of different material from the central portion.

The primary object of the invention is to provide a simple and inexpensive type of wheel designed so that the parts which constitute the working faces or the parts which are subjected to the greatest strains during use, may be made of a material best suited for the work required of this part and the other structural parts made of relatively cheaper material or of material best suited for the work required of these other parts.

Incidental to this general object, it is further desired, to form the working surfaces of the least possible amount of the material used at this place and further to provide a construction by which this relatively small amount of material is securely and permanently fastened to the body portion of the wheel.

Still further objects of the invention, when considered in connection with a gear wheel, are to provide the toothed portion of the least possible amount of material, to reinforce this portion against distorting strains in all directions and to provide an anti-creeping connection between each tooth and the body portion of the gear wheel.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

Figure 1:
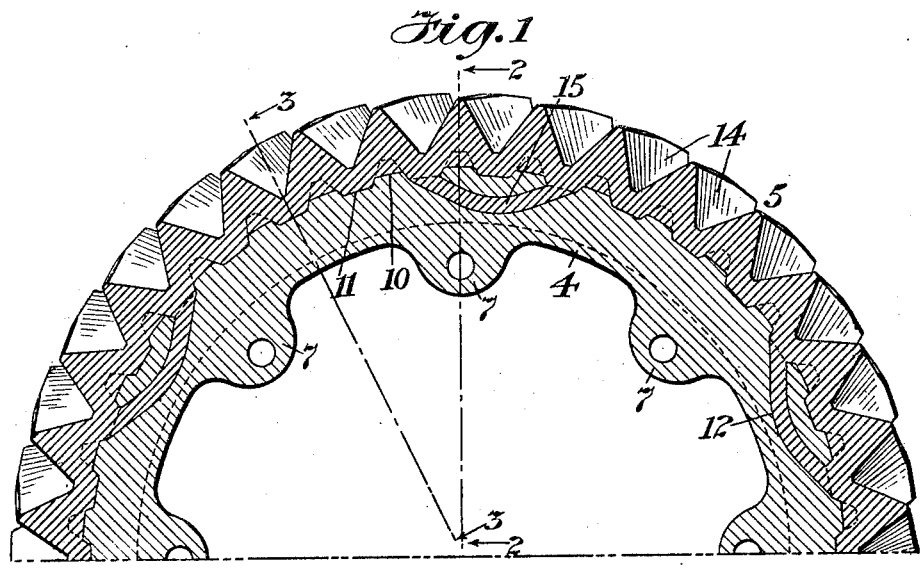
Figure 2:
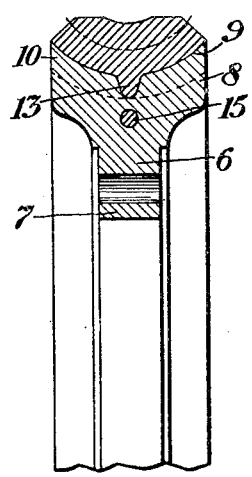
Figure 3:
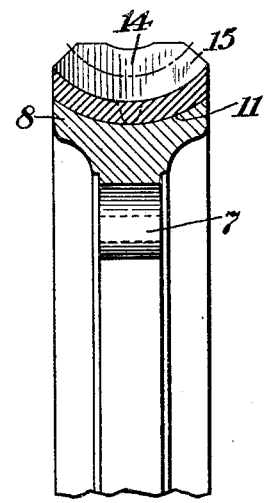

In the accompanying drawings:

Figure 1 is a sectional view taken through the medial plane of the upper half of a gear wheel constituting a preferred embodiment of my invention; and Figs. 2 and 3 are each transverse sectional views taken respectively on the lines 2—2 and 3—3 of Fig. 1.

The form of wheel illustrated is a spiral gear wheel particularly designed to mesh with a worm to constitute part of a driving connection in an automobile power plant.

The wheel includes a central portion or inner band 4 formed of some tough and preferably cheap metal such as cast-iron and a peripheral or outer band 5 of a bronze metal. The central portion comprises a rim 6 having inwardly projecting and perforated lugs 7 spaced about the inner periphery and designed to constitute a means for fastening the wheel in position on its shaft or supporting spider (not shown). A broad banded felly 8 integral with the rim, has its outer periphery in the form of a groove 9 slightly concaved transversely of the wheel.

Circumferentially this outer periphery is provided with spaced apart wide flat projections 10 forming similarly shaped recesses 11 therebetween. These parts are so designed that the tops of the projections and the bottom faces of the recesses are flat, with the flat portions of the recesses slightly longer, circumferentially of the wheel, than the flat tops of the projections similarly measured.

The central portion of the wheel is provided with a plurality of locking channels 12 forming by-passes spaced circumferentially, curved from one to another point in the groove 9 and with the curved or crotch portion contained largely in the rim portion of the wheel.

The central portion of each projection 10 is recessed to provide a centrally disposed locking notch 13, parabolical in transverse cross-section and extending substantially to the bottom of the projection.

The outer band 5 is cast in the form of a corrugated band, the outwardly extending projections of which constitute gear teeth 14, which, in the form illustrated, are inclined transversely of the wheel. The inner periphery of this band 5 conforms to the configuration of the outer periphery of the central portion 4 and is shrunk into tight frictional engagement therewith in the process of solidifying.

The projections 10 extend centrally into the portions of the outer band which form the teeth so that each of the V-shaped teeth has a working face formed of one grade of material with the major portion of its base formed interiorly of another grade of material.

A locking loop 15 of metal integral with the outer band and extending from the inner face of one to another of the inwardly extending projections fitting in the recesses 11 is positioned within each of the locking channels 12.

The wheel is constructed preferably by casting the inner band in the form described which is then placed in a mold and the metal of the outer rim cast about the inner band in a manner so that the metal runs through the several passageways or channels 12 to form the locking loops.

By means of a device of this character, a construction is provided in which the bands are securely locked against displacement in any direction. Transverse movement is resisted at the base of the outer band due to the concave fit between the bands and at the tops of the projections due to the interfitting tongue and groove connection formed at the center of each projection. Any tendency to creep circumferentially is resisted by the tongue and groove construction formed by the lateral projections on the inner band extending into the similar recesses formed thereby in the outer band, and as these tongues are of some material thickness any bending action is eliminated.

As a further precaution against relative movement the locking loops are utilized, thus securely binding the bands together and forming, in effect, a one-piece construction with all the advantages of an integral casting.

By means of this construction there is provided an economical distribution of the more expensive bronze. All of the gear teeth have a material thickness of this metal, where necessary, but the thick base portion of each tooth has an insert of the cheaper iron projecting into the bottom thereof. This insures a saving of bronze metal at a place where solid bronze is not only unnecessary but the backing of iron adds a tensile strength to the teeth not possible where they are constructed entirely of bronze metal. The bronze metal is extended for some material depth at the medial plane of the rim (see Fig. 2) thus distributing the metal where it is most likely to be needed as the gear teeth wear away and insuring a maximum life to the wheel.

Having thus described my invention, I claim:

1. A gear wheel including a center portion provided with circumferentially spaced projections extending radially therefrom, a toothed metallic band encircling said center portion and provided with a recess designed to contain one of said projections thereby to assist in retaining the rim in place, said recess being positioned within the part of the band forming one of the teeth thereby economizing in the use of metal constituting the rim.

2. A metallic band designed to constitute the toothed portion of a gear wheel, the inner periphery of said band being corrugated transversely of the plane of the rim and having a radial thickness of said metal deepest at center and decreasing in depth toward each side, the corrugations at the outer periphery constituting gear teeth and a central reinforcing portion disposed within said band and fastened thereto.

3. A gear wheel including a pair of concentrically disposed rims, the outer rim provided with gear teeth and also provided with projections fitting into the inner rim to prevent relative movement between the rims, said projections being spaced apart circumferentially of the wheel a distance substantially equal to the similar width of the projections.

4. A device of the class described, comprising a pair of rims fitting one within the other, with the engaging surfaces of said rims concaved laterally of the plane of the device and extending from side to side and said engaging surfaces being corrugated, with the corrugations positioned relatively close together, thereby to assist in preventing relative movement of the rims circumferentially of each other.

5. In a device of the class described, the combination of two rims, one fitting within the other, one of the rims provided with an integral extension looped through the other rim to retain the rims in place.

6. In a device of the class described, the combination of two interfitting rims having a common contacting surface, the outer of said rims having an integral extension passing across said surface and through the inner rim.

7. In a device of the class described, the combination of two interfitting rims, the outer rim provided with a curved extension cast into the other rim to fasten the rims together against relative movement in all directions.

8. A wheel comprising an inner member provided with a curved passageway opening into the periphery thereof, an outer band cast about the periphery of the inner member and having a portion projecting into said curved passageway.

9. A gear wheel including an inner member and a toothed member cast about the periphery of the inner member, each tooth of said tooth forming member having a tongue and groove connection with the inner member.

10. A gear wheel including an inner member and a toothed member cast about the periphery of the inner member, each tooth of said tooth forming member having a tongue and groove connection with the inner member, certain of the tongues of said connections being united through the inner member.

11. A gear having a center of comparatively strong metal and a surrounding ring of comparatively weak anti-friction material, said parts cast together and having inter-engaging shoulders adapted to restrain relative movement in opposite axial directions and an extension having opposite ends formed integrally with said surrounding ring and passing through an adjacent part of the center.

12. A gear having a center of comparatively strong metal and teeth of comparatively weak anti-friction material, and stubs formed in the center and entering said teeth.

13. A gear having a center of comparatively strong metal with an annular groove in its outer face, and a ring of comparatively weak anti-friction material cast in said groove, said center having also openings extending toward the axis and said ring having projections cast therewith and entering said openings.

14. A gear having a center of cast iron with an annular groove extending around the rim thereof and with holes in said rim and a bronze ring cast in said groove and with projections entering the holes in the rim of the cast iron center, so as to firmly anchor the bronze ring on the cast iron center, said rim having teeth cut therein.

Signed at Cleveland, in the county of Cuyahoga, and State of Ohio this 4th day of February, 1916.

DAVID FITZPATRICK.